Feb. 23, 1954
H. L. MALONE ET AL
2,669,917
TWO-BLADE AND COVER BLIND SHUTTER
Filed Nov. 21, 1952
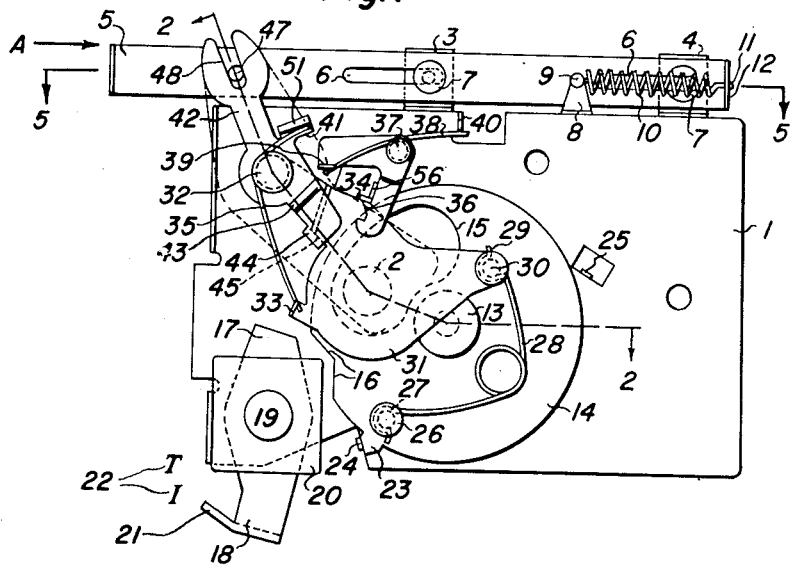
HAROLD L. MALONE
EDGAR S. MARVIN
INVENTOR.
BY
ATTORNEYS Patented Feb. 23, 1954

2,669,917

UNITED STATES PATENT OFFICE 2,669,917

TWO-BLADE AND COVER BLIND SHUTTER

Harold L. Malone and Edgar S. Marvin, Rochester, N. Y., assignors to Eastman Kodak Company, Rochester, N. Y., a corporation of New Jersey Application November 21, 1952, Serial No. 321,350

3 Claims. (Cl. 95—60)

This invention relates to photography, and more particularly to shutters for photographic cameras.

Shutters now in use on box and other inexpensive cameras have generally been made as simple as possible, and ordinarily the shutters give a rather fast exposure such as, perhaps, 1/75 or 1/100 of a second, because it is less expensive to provide a shutter mechanism for producing such an exposure. For black-and-white negatives with the more recent types of fast films sufficient exposure can be obtained for most lighting conditions. Crude workmanship can be tolerated because strong springs may be used to operate the parts. Where fast exposures are made, there is comparatively little chance to shake a camera during exposure even where the trigger is operated by a strong spring and is somewhat difficult to depress.

In order to properly expose color films, slower exposures are essential. Usually inexpensive lenses may vary from f/12 to f/15 and it is desirable to have an exposure of between 1/25 and 1/50 of a second to properly expose color film with such objectives. It is also desirable to have the shutter made so that it may be operated by relatively light springs and so that only light pressure will be required on the trigger because, with slower exposures, it is an easy matter to shake the camera and spoil the exposure, particularly where considerable pressure is required on the trigger.

One object of our invention is to provide a slow-speed shutter, particularly for the less expensive type of camera. Another object is to provide a shutter in which only light pressure is required on the trigger to actuate the shutter. Another object is to provide a simply constructed shutter which is accurate in that the single selected speed is both relatively slow and can be repeated accurately each time an exposure is made. A still further object of our invention is to provide a shutter in which the exposure has a high degree of uniformity. Still another object of our invention is to provide a shutter of the type in which there are two successively operated blades to make an exposure and a cover blind to insure light-tightness of the shutter blades when closed. Other objects will appear from the following specification, the novel features being particularly pointed out in the claims at the end thereof.

This shutter is for an improvement over the shutter shown in U. S. Patent 2,443,164, Harvey, granted June 8, 1948.

Coming now to the drawings wherein like reference characters denote like parts throughout Fig. 1 is a front plan view of a shutter constructed in accordance with and embodying a preferred form of our invention;

Fig. 2 is a fragmentary detail section taken on line 2—2 of Fig. 1;

Fig. 3 is a fragmentary front plan view with the shutter trigger depressed throughout the greater range of its movement and in a position in which slight further movement will release the shutter for an exposure;

Fig. 4 is a fragmentary detail rear view of the shutter plate showing the cover blind; and Fig. 5 is a fragmentary section through portions of the trigger and elements cooperating therewith. This section is taken on line 5—5 of Fig. 1.

Our shutter consists broadly in a mechanism in which there are two shutter blades, one normally open with respect to a shutter aperture, and the other normally closed with respect to the shutter aperture. There is also a cover blind normally closed with respect to the shutter aperture. When the shutter blades are to be actuated, a shutter trigger is depressed, moving the cover blind from the exposure aperture, then releasing the normally closed shutter blade to open the exposure aperture, this shutter blade setting and releasing a spring which closes the normally opened shutter blade. The successive operation of the two shutter blades is unaffected by the speed of operation of the trigger and results in extremely constant exposures.

More specifically, our shutter may comprise a shutter plate 1 of the desired shape to fit into a camera or an enclosure for the shutter. This plate 1, in the present instance, is generally rectangular in shape and is provided with an exposure opening 2. Arms 3 and 4 extend upwardly from the top edge of the plate to slidably support a trigger 5 which is provided with a pair of slots 6 through which studs 7 may pass. A third arm 8 projects upwardly from the shutter plate to support one end 9 of a light coiled spring 10 attached at 11 to a flange 12 on the end of the trigger. This spring tends to hold the trigger in the normal rest position shown in Fig. 1.

The shutter plate carries a stud 13 on which a normally open shutter blade 14 is mounted so that a slot 15 will normally lie in such a position as to expose the exposure aperture 2. This blade is of a generally circular shape having a pair of spaced angular walls 16. These walls may be engaged by the ends 17 of a time lever 18 which is fastened to the shutter plate 1 by a stud 19 passing through a spring washer 20. Thus, when a pointer 21 points to "I," schematically shown at 22, Fig. 1, the shutter is in position for instantaneous exposures and when it points to "T" the shutter is in position for time exposures.

The shutter blade 14 is provided with an offset finger 23 normally resting against lug 24 formed up from the shutter plate 1 but capable of moving from this position to a stop 25 also formed up from the shutter plate 1 when the shutter blade 14 swings to close the exposure aperture 2. The shutter blade 14 is provided with a stud 26 around which one end 27 of a hairpin spring 28 is looped, the opposite end 29 of this spring being carried by a stud 30 which in turn is carried by the normally closed shutter blade 31.

Shutter blade 31 is mounted to swing on a stud 32 carried by the shutter plate 1 and it includes an upstanding arm 33 and an upstanding lug 34. The arm 33 supports the end of a spring 35 which drives the shutter blade 31. The lug 34 forms a catch for the latch element 36 pivoted at 37 to the shutter plate and it is pressed in a generally clockwise direction and into the position shown in Fig. 1 by means of a spring 38 engaging a flange 39 on the latch element and a flange 40 carried by the shutter plate 1. This bell crank shaped latch element includes the flange 39 which has an additional function of forming an arm against which a flange 41 on the lever 42 may strike as will be hereinafter more fully described. The lever 42 is pivotally mounted on the stud 32 and it is bent downwardly at 43 so that a lug 44 may pass inwardly and into a position to engage the edge 45 of the normally closed shutter blade 31 when the parts are in their Fig. 1 position.

The trigger 5 includes a pin 47 which, as best shown in Fig. 5, extends in both directions from the trigger 5 and, in the position shown in full lines in Fig. 4, the pin 47 extends forwardly and engages the slot 49 of a cover blind 50 which is preferably also pivoted on the stud 32 and which normally lies over the exposure aperture 2, thus rendering this aperture light-tight.

With the parts as above described with reference to Fig. 1, pressure on the trigger 5 in the direction shown by the arrow A causes the trigger to move to the right with respect to this figure, moving the cover blind 50 away from the aperture 2 during the first part of the movement. As the movement continues, the flange 41 on the lever 42 strikes the flange 39 of the bell crank lever latch member 36, rocking it in a counterclockwise direction to release the latch elements 34, 36. This occurs when the trigger is depressed slightly further to the right than is shown in Fig. 3, which figure shows the operating flanges coming into engagement. During this portion of the movement of the trigger from the Fig. 1 to the Fig. 3 position, spring 35 is placed under tension because of the clockwise movement of a flange 51 which winds the spring in a clockwise direction. When the latch elements 34, 36 become disengaged, the normally closed shutter blade 31 swings in a clockwise direction, thereby uncovering the exposure aperture 2 as the edge 52 of the cover blind crosses the aperture 2.

At this instant, the exposure through aperture 2 is started because the slot 15 in the cover blade 14 is lying across the exposure aperture 2. However, as the hairpin spring 28 is tensioned by the stud 30 swinging in a clockwise direction, it will continue to be tensioned more and more until the stud 30 passes between the studs 32 and 26 at which time the hairpin spring will be completely tensioned so that it may be finally released, causing the normally closed shutter blade 14 to swing in a counterclockwise direction while the stop 23 moves from the lug 24 to the lug 25, at which latter position the exposure aperture is again closed.

When the exposure has been completed, pressure is released on the trigger 5 and the spring 10 will return the trigger to its Fig. 1 position. This movement releases some of the pressure from the drive spring 35 and at the same time causes the lug 44 to engage the shutter blade 31 so that it will be moved by lever 42 back to its Fig. 1 position. As this movement takes place, the hairpin spring 28 is again tensioned and released, this time in an opposite direction, as the stud 30 swings back to its Fig. 1 position but, before movement of the shutter blade 14 occurs, the cover blind 50 will have been moved a sufficient distance to cover the exposure aperture 2 so that no light may enter during the resetting movement of the shutter blades 31 and 14. The shutter blade 13 will be moved to re-engage the latch elements 34 and 36 so that the next cycle can take place.

If time exposures are required, the lever 18 may be swung in a clockwise direction with respect to Fig. 1 so that the pointer 21 will point to "T." This will cause the stop arm 17 to engage the angularly disposed walls 16 of the shutter blade 14 and, consequently, this shutter blade will be unable to move, even though the hairpin spring 28 is tensioned and released as shutter blade 31 swings to its open position when the trigger is actuated. Therefore, since the cover blind 50 and the shutter blade 31 are opened by pressure on the trigger, and since shutter blade 14 is already open, an exposure will be made and will be terminated when the trigger 5 is released to return with the shutter blade 31 and cover blind 50 to its initial or Fig. 1 position.

While the described construction shows a preferred embodiment of our invention which is well adapted for practical use, it should be pointed out that this construction permits extremely lightweight springs to be employed. The hairpin spring 28 is made of extremely lightweight material which can readily be tensioned and released by the action of the spring 35 in opening the shutter blade 31. The spring 35 is only under relatively light tension in its rest position, shown in Fig. 1, but it is wound up to a limited extent by the operation of the lever 42 when this lever is moved by means of the trigger 5 through the pin 47. Thus, spring 35 only has to be heavy enough to just overcome the tension of the hairpin spring and to drive the shutter blade 31 and, since there are only these two light springs to be overcome by the spring 10, this spring also may be made comparatively light so that the pressure on the trigger A need not be great and so that the shutter can be released by light pressure. The spring 38 holding the latch element 36 in its operative position is likewise a comparatively light spring as the sole function of this spring is to hold the latch 36 in a position to engage the latch element 34 when the shutter blade 31 moves to its closed position. A stop 56 may be provided on the shutter plate 1 to limit the clockwise movement of the bell crank latch element 36 under the influence of spring 38.

Having thus described our invention, what we claim is new and desire to secure by Letters Patent of the United States is:

1. A camera shutter comprising an apertured supporting plate, a movable trigger, a first lever pivotally mounted on one side of the plate, a second lever pivotally mounted on the other side of the plate, interengaging elements on each of the levers and the trigger for operating the levers by the trigger, a spring tending to move the trigger to a rest position, the first lever including an aperture covering portion and constituting a cover blind, the second lever carrying a lug, a first pivoted shutter blade having a rest position covering the exposure aperture and having a latch element thereon, and movable from its rest position to uncover the exposure aperture, a second pivoted shutter blade having a rest position exposing the exposure aperture and movable therefrom to cover the exposure aperture, a hairpin spring connecting the first and second shutter blades to drive the latter by the former, a spring between the second lever and the first shutter blade for driving the latter by the former, a latch element pivotally mounted on the plate and positioned to engage the latch element of the first shutter blade in its position of rest, means on the second lever for engaging and releasing the latch element, said spring between the second lever and the first shutter blade being tensioned as the lever moves to release the latch element, the normally closed shutter blade when released moving to tension the hairpin spring connecting it to the normally open shutter blade to tension and finally release said hairpin spring whereby the normally open blade may move to close the exposure aperture completing an exposure.

2. The shutter construction defined in claim 1, characterized in that the pivoted shutter blind lies in substantial contact with the supporting plate and in that the normally closed shutter blind is spaced therefrom whereby the latter may turn freely about its pivot.

3. A camera shutter comprising an apertured supporting plate, a movable trigger, a first lever pivotally mounted on one side of the plate, a second lever pivotally mounted on the other side of the plate, the two pivotally mounted levers being coaxially pivoted, interengaging elements on each of the levers and the trigger comprising pins and slots for operating the levers by the trigger, a spring tending to move the trigger to a rest position, the first lever including an aperture covering portion and constituting a cover blind, the second lever carrying a lug, a first pivoted shutter blade having a rest position covering the exposure aperture and having a latch element thereon, and movable from its rest position to uncover the exposure aperture, a second pivoted shutter blade having a rest position exposing the exposure aperture and movable therefrom to cover the exposure aperture, a hairpin spring connecting the first and second shutter blades to drive the latter by the former, a spring between the second lever and the first shutter blade for driving the latter by the former, a latch element pivotally mounted on the plate and positioned to engage the latch element of the first shutter blade in its position of rest, means on the second lever for engaging and releasing the latch element, said spring between the second lever and the first shutter blade being tensioned as the lever moves to release the latch element, the normally closed shutter blade when released moving to tension the hairpin spring connecting it to the normally open shutter blade to tension and finally release said hairpin spring whereby the normally open blade may move to close the exposure aperture completing an exposure.

HAROLD L. MALONE.
EDGAR S. MARVIN.

No references cited.